(12) United States Patent
Ogata

(10) Patent No.: US 11,847,562 B2
(45) Date of Patent: *Dec. 19, 2023

(54) OBSTACLE RECOGNITION ASSISTANCE DEVICE, OBSTACLE RECOGNITION ASSISTANCE METHOD, AND STORAGE MEDIUM

(71) Applicant: NEC Corporation, Tokyo (JP)

(72) Inventor: Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,816

(22) Filed: Jun. 27, 2022

(65) Prior Publication Data

US 2022/0327329 A1 Oct. 13, 2022

Related U.S. Application Data

(63) Continuation of application No. 16/982,339, filed as application No. PCT/JP2019/008016 on Mar. 1, 2019, now Pat. No. 11,403,494.

(30) Foreign Application Priority Data

Mar. 20, 2018 (JP) .................................. 2018-052475

(51) Int. Cl.
*G06N 3/08* (2023.01)
*G06N 20/00* (2019.01)
(Continued)

(52) U.S. Cl.
CPC ............. *G06N 3/08* (2013.01); *G06F 18/214* (2023.01); *G06F 18/217* (2023.01); *G06N 20/00* (2019.01);
(Continued)

(58) Field of Classification Search
CPC .. G06K 9/6262; G06K 9/6256; G06K 9/6264; G06K 9/6271; G06N 20/00;
(Continued)

(56) References Cited

U.S. PATENT DOCUMENTS 10,546,201 B2 * 1/2020 Kang .................... G06V 10/764
10,831,636 B2 * 11/2020 Morley ............... G06F 11/3608
(Continued)

FOREIGN PATENT DOCUMENTS

JP 08-309464 A 11/1994
JP 2004-017876 A 1/2004
(Continued)

OTHER PUBLICATIONS

International Search Report for PCT/JP2019/008016 dated Jun. 4, 2019 (PCT/ISA/210).

*Primary Examiner* — Lewis G West
(74) *Attorney, Agent, or Firm* — Sughrue Mion, PLLC

(57) ABSTRACT

An obstacle recognition assistance device includes: a memory configured to store instructions; and a processor configured to execute the instructions to acquire a first recognition result and sensing information. The first recognition result is a result based on a first recognition process performed using the sensing information acquired by an obstacle sensing device. The first recognition result indicates whether or not an obstacle is present. The processor is further configured to execute the instructions to verify whether the first recognition result is incorrect based on the first recognition result and a second recognition result. The second recognition result is a result based on a second recognition process performed using the sensing information. The second recognition process indicates whether or (Continued)

not the obstacle is present. The processor is further configured to execute the instructions to record a verification result.

18 Claims, 6 Drawing Sheets

(51) Int. Cl.
*G06V 20/58* (2022.01)
*G06F 18/21* (2023.01)
*G06F 18/214* (2023.01)
*G06V 10/764* (2022.01)
*G06V 10/778* (2022.01)
*G06V 10/82* (2022.01)

(52) U.S. Cl.
CPC ........ *G06V 10/764* (2022.01); *G06V 10/7788* (2022.01); *G06V 10/82* (2022.01); *G06V 20/58* (2022.01)

(58) Field of Classification Search
CPC ........ G06N 3/0454; G06N 3/08; G06V 20/58; G06V 10/82; G06T 7/00; G08G 1/16
See application file for complete search history.

(56) References Cited

U.S. PATENT DOCUMENTS

| | | | |
|---|---|---|---|
| 11,402,484 B2* | 8/2022 | Ogura | G01S 7/354 |
| 2003/0044070 A1* | 3/2003 | Fuersich | G06T 5/005 |
| | | | 382/209 |
| 2003/0236605 A1* | 12/2003 | Takahashi | B60T 7/22 |
| | | | 348/148 |
| 2003/0236805 A1 | 12/2003 | Takahashi | |
| 2015/0199617 A1 | 7/2015 | Kuwajima | |
| 2017/0213149 A1* | 7/2017 | Micks | G06N 3/088 |
| 2018/0012082 A1* | 1/2018 | Satazoda | G06V 10/763 |
| 2019/0147340 A1* | 5/2019 | Zhang | G06N 3/084 |
| | | | 706/25 |
| 2019/0188510 A1* | 6/2019 | Han | G06V 40/16 |
| 2019/0213399 A1* | 7/2019 | Yoo | G06N 3/084 |
| 2020/0202199 A1* | 6/2020 | Lee | G06N 3/084 |
| 2021/0182664 A1* | 6/2021 | Kim | G06F 18/00 |
| 2021/0244252 A1* | 8/2021 | Kim | A47L 11/4011 |
| 2021/0406604 A1* | 12/2021 | Collberg | G06V 10/454 |

FOREIGN PATENT DOCUMENTS

| | | |
|---|---|---|
| JP | 2010-256943 A | 11/2010 |
| JP | 2015-135562 A | 7/2015 |
| JP | 2017-055181 A | 3/2017 |

\* cited by examiner

OBSTACLE RECOGNITION ASSISTANCE DEVICE, OBSTACLE RECOGNITION ASSISTANCE METHOD, AND STORAGE MEDIUM

CROSS-REFERENCE TO RELATED APPLICATIONS

The present application is a continuation application of U.S. patent application Ser. No. 16/982,339 filed on Sep. 18, 2020, which is a National Stage Entry of international application PCT/JP2019/008016 filed on Mar. 1, 2019, which claims the benefit of priority from Japanese Patent Application No. 2018-052475 filed on Mar. 20, 2018, the disclosures of all of which are incorporated in their entirety by reference herein.

TECHNICAL FIELD

The present invention relates to an obstacle recognition assistance device, an obstacle recognition assistance method, and a storage medium.

BACKGROUND ART

A technique has been employed in which an obstacle recognition device is provided in a vehicle or the like, with the vehicle being automatically controlled when an obstacle is recognized to improve the safety in driving the vehicle. Techniques for determining incorrect detection or non-detection in recognizing such an obstacle are disclosed in Patent Documents 1 and 2.

PRIOR ART DOCUMENTS

Patent Documents

[Patent Document 1] Japanese Unexamined Patent Application, First Publication No. 2017-055181
[Patent Document 2] Japanese Unexamined Patent Application, First Publication No. 2004-017876

SUMMARY OF THE INVENTION

Problem to be Solved by the Invention

In the obstacle recognition device as described above, it is necessary to further improve the obstacle recognition accuracy.

An example object of the present invention is to provide an obstacle recognition assistance device, an obstacle recognition assistance method, and a storage medium that solves the above issue.

Means for Solving the Problem

According to first example aspect of the present invention, an obstacle recognition assistance device includes: an acquisition unit that acquires a first recognition result and sensing information, the first recognition result being a result based on a first recognition process performed using the sensing information acquired by an obstacle sensing device, the first recognition result indicating whether or not an obstacle is present, the first recognition result being determined to be incorrect; and a recording unit that verifies whether the first recognition result is incorrect based on the first recognition result and a second recognition result, the second recognition result being a result based on a second recognition process performed using the sensing information, the second recognition process indicating whether or not the obstacle is present, the recording unit recording at least one of first learning use data and second learning use data when it is verified that the first recognition result is incorrect, the first learning use data including at least a combination of the sensing information and negation information indicating a negation of the first recognition result, the second learning use data including at least a combination of the sensing information and affirmation information indicating an affirmation of the second recognition result.

According to a second example aspect of the present invention, an obstacle recognition assistance method includes: acquiring a first recognition result and sensing information, the first recognition result being a result based on a first recognition process performed using the sensing information acquired by an obstacle sensing device, the first recognition result indicating whether or not an obstacle is present, the first recognition result being determined to be incorrect; verifying whether the first recognition result is incorrect based on the first recognition result and a second recognition result, the second recognition result being a result based on a second recognition process performed using the sensing information, the second recognition process indicating whether or not the obstacle is present; and recording at least one of first learning use data and second learning use data when it is verified that the first recognition result is incorrect, the first learning use data including at least a combination of the sensing information and negation information indicating a negation of the first recognition result, the second learning use data including at least a combination of the sensing information and affirmation information indicating an affirmation of the second recognition result.

According to a third example aspect of the present invention, a storage medium stores a program that causes a computer to execute: acquiring a first recognition result and sensing information, the first recognition result being a result based on a first recognition process performed using the sensing information acquired by an obstacle sensing device, the first recognition result indicating whether or not an obstacle is present, the first recognition result being determined to be incorrect; verifying whether the first recognition result is incorrect based on the first recognition result and a second recognition result, the second recognition result being a result based on a second recognition process performed using the sensing information, the second recognition process indicating whether or not the obstacle is present; and recording at least one of first learning use data and second learning use data when it is verified that the first recognition result is incorrect, the first learning use data including at least a combination of the sensing information and negation information indicating a negation of the first recognition result, the second learning use data including at least a combination of the sensing information and affirmation information indicating an affirmation of the second recognition result.

Effect of the Invention

According to an example embodiment of the present invention, it is possible to further improve the recognition accuracy of an obstacle in an obstacle recognition device.

EXAMPLE EMBODIMENT

Hereinbelow, an obstacle recognition assistance device, an obstacle recognition assistance method, and a storage medium according to example embodiments of the present invention will be described with reference to the drawings.

Figure 1:
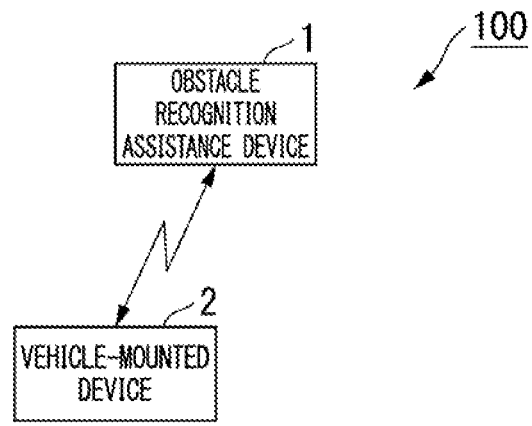
FIG. 1 is a diagram showing a configuration of an obstacle recognition system.

FIG. 1 is a diagram showing a configuration of an obstacle recognition system including the obstacle recognition assistance device according to an example embodiment of the present invention.

As shown in FIG. 1, the obstacle recognition system 100 includes an obstacle recognition assistance device 1 and a vehicle-mounted device 2 which is one form of an obstacle detection device. The vehicle-mounted device 2 is communicatively connected to a camera 3 provided in the vehicle. The camera 3 captures images in the traveling direction of the vehicle. The camera 3 may capture images of the front or the rear of the vehicle. The obstacle recognition assistance device 1 and the vehicle-mounted device 2 are connected via a wireless communication network or a wired communication network. The obstacle recognition assistance device 1 is communicatively connected to the vehicle-mounted device 2 installed in each of a plurality of vehicles running throughout a city.

Figure 2:
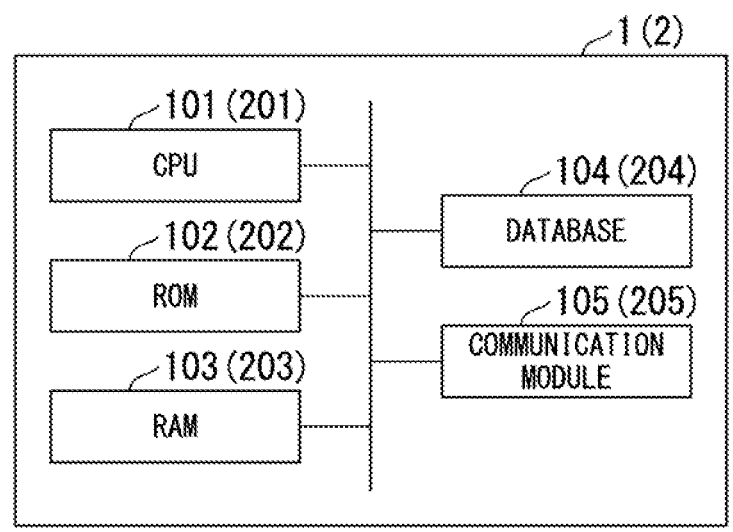
FIG. 2 is a hardware configuration diagram of an obstacle recognition assistance device.

FIG. 2 is a hardware configuration diagram of the obstacle recognition assistance device.

As shown in FIG. 2, the obstacle recognition assistance device 1 is a computer including hardware such as a CPU (Central Processing Unit) 101, a ROM (Read Only Memory) 102, a RAM (Random Access Memory) 103, a database 104, and a communication module 105. The vehicle-mounted device 2 also has a similar hardware configuration.

Corresponding hardware in the vehicle-mounted device 2 will be referred to as a CPU 201, a ROM 202, a RAM 203, a database 204, and a communication module 205, respectively.

Figure 3A:
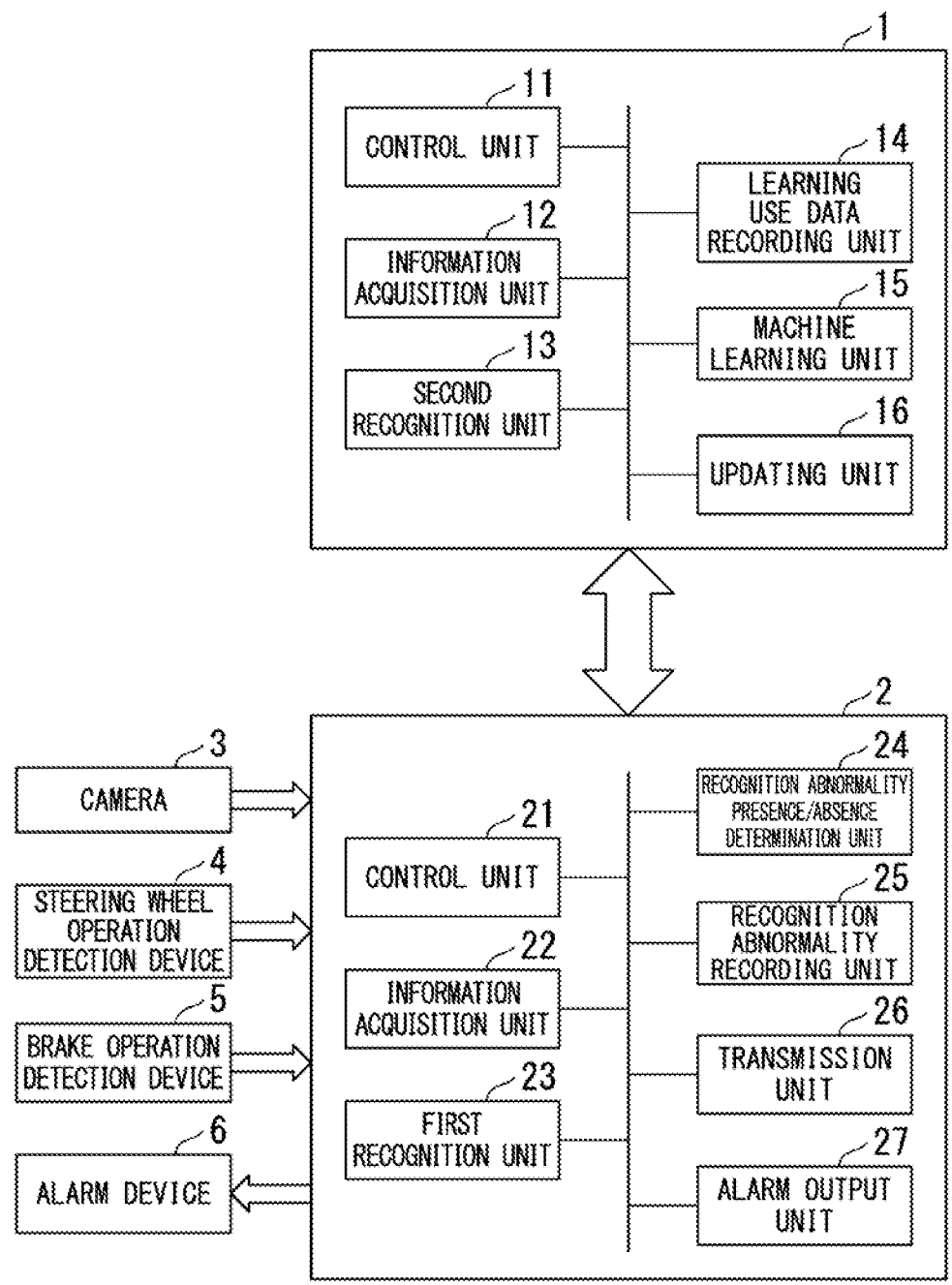
FIG. 3A is a function block diagram of a vehicle-mounted device and the obstacle recognition assistance device.

FIG. 3A is a function block diagram of the vehicle-mounted device and the obstacle recognition assistance device.

The vehicle-mounted device 2 is activated when the power is turned on and executes an obstacle recognition program stored in advance. Thereby, the vehicle-mounted device 2 exhibits at least the functions of a control unit 21, an information acquisition unit 22, a first recognition unit 23, a recognition abnormality presence/absence determination unit (determination unit) 24, a recognition abnormality recording unit (recording unit) 25, a transmission unit 26, and an alarm output unit 27.

The control unit 21 controls other function units of the vehicle-mounted device 2.

The information acquisition unit 22 acquires information from the camera 3, a steering wheel operation detection device 4, and a brake operation detection device 5. The camera 3 captures images in the traveling direction such as the front or rear of the vehicle and outputs the captured images to the vehicle-mounted device 2. The information acquisition unit 22 acquires the captured images from the camera 3. The information acquisition unit 22 also acquires steering wheel operation information from the steering wheel operation detection device 4. The steering wheel operation information may be operation information such as the rotation angle of the steering wheel with respect to a reference angle. The information acquisition unit 22 also acquires brake operation information from the brake operation detection device 5. The brake operation information may be operation information such as brake strength.

The first recognition unit 23 generates a first recognition result indicating whether there is an obstacle on the basis of the captured image.

The recognition abnormality presence/absence determination unit 24 determines whether or not there is a recognition abnormality in the recognition of the presence or absence of an obstacle indicated by the first recognition result on the basis of the first recognition result and the operation information. That is, the recognition abnormality presence/absence determination unit 24 determines whether the first recognition result is correct or incorrect based on the first recognition result and the operation information.

The recognition abnormality recording unit 25 records the recognition abnormality result including the captured image and the first recognition result in the database 204 when there is a recognition abnormality in the recognition of the presence or absence of an obstacle indicated by the first recognition result. That is, the recognition abnormality recording unit 25 records the recognition abnormality result including the captured image and the first recognition result in the database 204 when it is determined that the first recognition result is incorrect.

The transmission unit 26 transmits the recognition abnormality result to the remote obstacle recognition assistance device 1 connected by communication.

The alarm output unit 27 outputs alarm information to the alarm device 6 when the first recognition result indicating that there is an obstacle has been output from the first recognition unit 23. The obstacle may be, for example, a rock.

The obstacle recognition assistance device 1 is activated when the power is turned on, and executes an obstacle recognition assistance program stored in advance. As a result, the obstacle recognition assistance device 1 exhibits at least the functions of a control unit 11, an information acquisition unit 12, a second recognition unit 13, a learning use data recording unit (recording unit) 14, a machine learning unit 15, and an updating unit 16.

The control unit 11 controls other function units.

The information acquisition unit 12 acquires the first recognition result together with the sensing information when the first recognition result is a recognition abnormality. The first recognition result is output as a result of a first recognition process using an obstacle recognition control parameter and the sensing information of the obstacle detection device, and indicates whether or not there is an obstacle. The sensing information is a captured image in this example embodiment. The device that generates the first recognition result indicating whether or not there is an obstacle using the first recognition process is the vehicle-mounted device 2 in the present example embodiment. The device for determining whether the first recognition result is a recognition abnormality is also the vehicle-mounted device 2 in the present example embodiment. The vehicle-mounted device 2 generates the first recognition result by using the first recognition process based on the obstacle recognition control parameter and the image captured by the communication-connected camera 3. Then, the vehicle-mounted device 2 determines whether the first recognition result is a recognition abnormality based on the first recognition result and the operation information of the driver. When the vehicle-mounted device 2 determines that the first recognition result is a recognition abnormality, the vehicle-mounted device 2 transmits the first recognition result and the captured image to the obstacle recognition assistance device 1. Then, the obstacle recognition assistance device 1 acquires the first recognition result and the captured image.

The second recognition unit 13 uses a second recognition process to generate a second recognition result indicating whether or not there is an obstacle in the captured image. The second recognition process for an obstacle performed by the obstacle recognition assistance device 1 using the captured image is an obstacle recognition process having a higher accuracy than the first recognition process for an obstacle performed by the vehicle-mounted device 2 using the captured image. Therefore, the second recognition process for an obstacle performed by the obstacle recognition assistance device 1 using the captured image performs a larger amount of calculation than the first recognition process for an obstacle performed by the vehicle-mounted device 2 using the captured image, in order to obtain a more accurate result.

The learning use data recording unit 14 verifies whether or not an obstacle recognition abnormality has occurred in the first recognition result on the basis of the first recognition result and the second recognition result. The learning use data recording unit 14 records the first learning use data or the second learning use data in the database 104 when it is verified that an obstacle recognition abnormality has occurred in the first recognition result. The first learning use data includes at least a combination of the captured image and negation information of the first recognition result. The second learning use data includes at least a combination of the captured image and affirmation information of the second recognition result. Specifically, the learning use data recording unit 14 records the first learning use data including at least the sensing information and the negation information that negates the first recognition result when it is verified that a recognition abnormality indicating an incorrect detection of an obstacle has occurred in the first recognition result. In the verification based on the first recognition result and the second recognition result, the learning use data recording unit 14 records the second learning use data including at least the captured image and the affirmation information that affirms the second recognition result when it is verified that a recognition abnormality indicating that an obstacle has not been detected has occurred in the first recognition result. The learning use data recording unit 14 records the first learning use data and the second learning use data by using the information acquired from the vehicle-mounted devices 2 of many vehicles running throughout a city.

The machine learning unit 15 performs machine learning using the first learning use data and the second learning use data accumulated in the database 104, and generates new obstacle recognition control parameters.

The updating unit 16 updates the obstacle recognition control parameters stored in the vehicle-mounted device 2. The obstacle recognition control parameters are, for example, various parameters for forming a convolutional neural network.

In the present example embodiment, on the basis of the highly accurate obstacle presence/absence recognition performed by the obstacle recognition assistance device 1 on the basis of a captured image, the result of the obstacle presence/absence recognition performed by the vehicle-mounted device 2 is verified, and machine learning of optimal obstacle recognition control parameters is repeated based on the verification results. As a result, the recognition accuracy of obstacles can be further improved than heretofore.

Figure 3B:
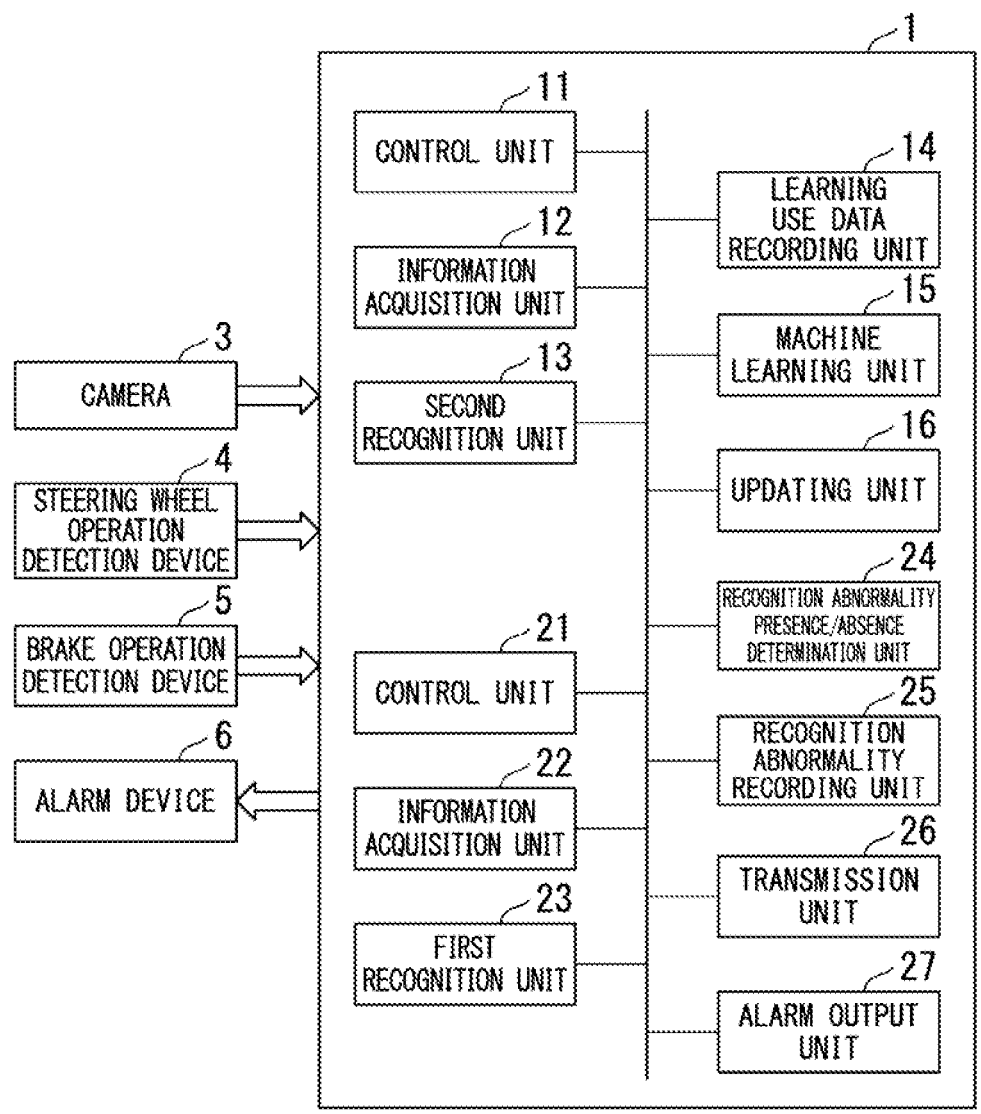
FIG. 3B is a function block diagram of an obstacle recognition assistance device according to a modified example.

As shown in FIG. 3B, the obstacle recognition assistance device 1 may include all of the configurations included in the vehicle-mounted device 2 shown in FIG. 3A.

Figure 4:
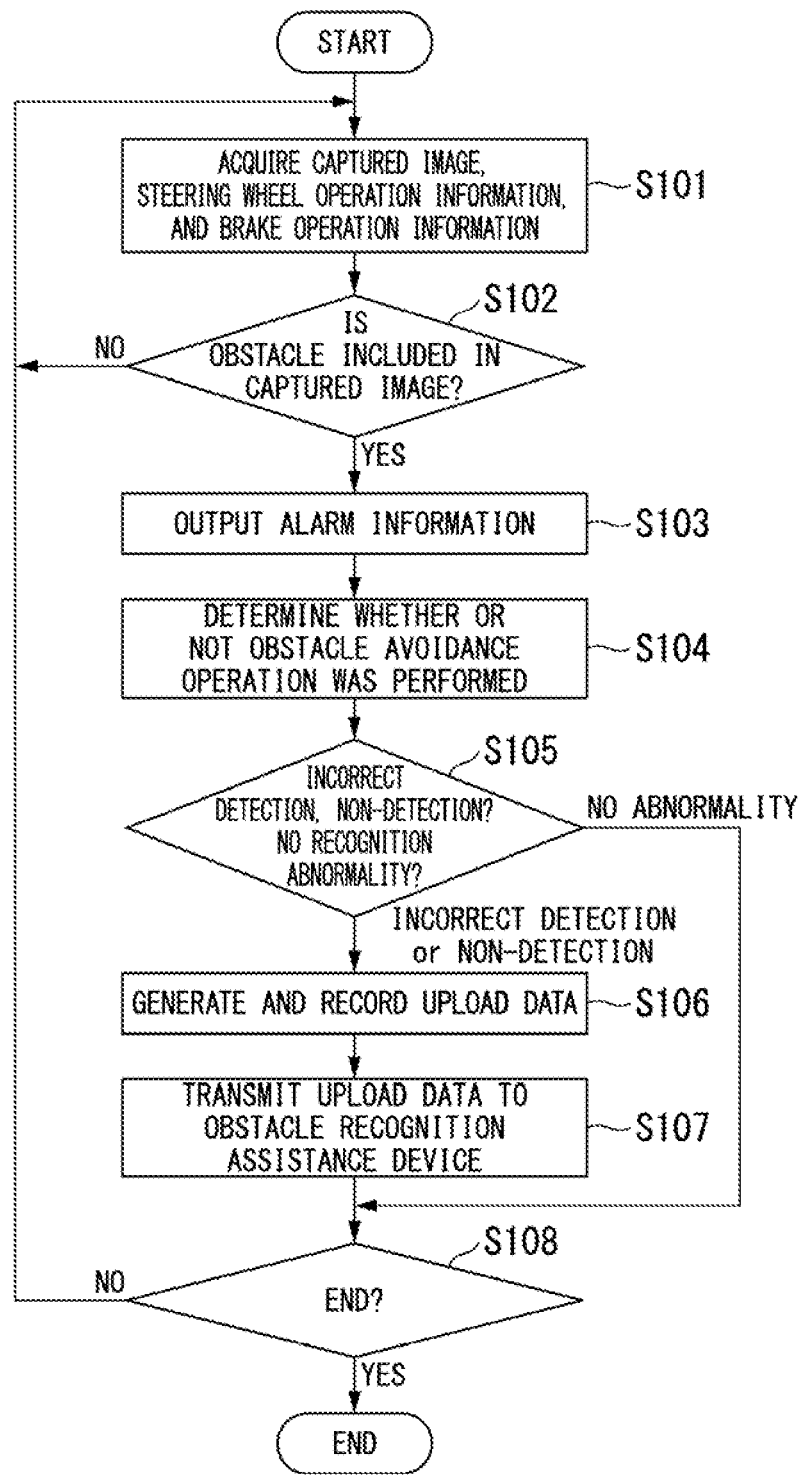
FIG. 4 is a diagram showing the processing flow of the vehicle-mounted device.

FIG. 4 is a diagram showing the processing flow of the vehicle-mounted device.

Next, the processing flow of the vehicle-mounted device 2 and the obstacle recognition assistance device 1 in the obstacle recognition system will be described step by step.

First, the camera 3 mounted on the vehicle captures an image at an angle of view within a predetermined angle range with the traveling direction such as forward or backward serving as a standard, and sends the captured image to the vehicle-mounted device 2. Also, the steering wheel operation detection device 4 transmits steering wheel operation information to the vehicle-mounted device 2. Also, the brake operation detection device 5 transmits brake operation information to the vehicle-mounted device 2. The information acquisition unit 22 of the vehicle-mounted device 2 acquires the captured image, the steering wheel operation information, and the brake operation information (Step S101). The information acquisition unit 22 acquires the captured image, the steering wheel operation information, and the brake operation information at predetermined intervals. The information acquisition unit 22 records the captured image, the steering wheel operation information, and the brake operation information in the sensing information storage area of the database 104 in association with the information acquisition time.

The first recognition unit 23 inputs the captured image to the first convolutional neural network configured based on the first obstacle recognition control parameter, and determines whether or not the captured image includes an obstacle (Step S102). The first obstacle recognition control parameter is information such as the weight of the branches forming the neural network. The first recognition unit 23 outputs the first recognition result indicating whether there is an obstacle to the recognition abnormality presence/absence determination unit 24 and the alarm output unit 27. The first recognition unit 23 detects the coordinates indicating the range of the obstacle in the captured image and adds the information of the coordinates in the first recognition result. The alarm output unit 27 outputs alarm information when the first recognition result includes an obstacle (Step S103). The alarm information is a warning sound or warning screen, and is output to a speaker or a monitor. As a result, the driver performs an avoidance operation (avoidance operation behavior). The avoidance operation is an operation of depressing the brake, an operation of turning the steering wheel to a large extent, and the like. The recognition abnormality presence/absence determination unit 24 acquires the first recognition result. The recognition abnormality presence/absence determination unit 24 acquires operation information at each time near the acquisition time of the captured image used to generate the acquired first recognition result. The operation information is steering wheel operation information and brake operation information.

The recognition abnormality presence/absence determination unit 24 determines whether or not an obstacle avoiding operation (operation for avoiding an obstacle) was performed based on the operation information (Step S104). For example, when the steering wheel rotation angle included in the steering wheel operation information indicates an angle deviated from the reference angle by a predetermined amount or more, the recognition abnormality presence/absence determination unit 24 determines that the operation of turning the steering wheel to a large extent has been performed, and determines that an obstacle avoidance operation has been performed. In addition, when for example the brake strength included in the brake operation information indicates a strength equal to or greater than a predetermined strength, the recognition abnormality presence/absence determination unit 24 determines that a sudden braking operation indicating that the brake has been greatly depressed has been performed, and determines that an obstacle avoidance operation has been performed.

The recognition abnormality presence/absence determination unit 24 determines whether the first recognition result generated by the first recognition unit 23 is incorrect detection, non-detection, or no recognition abnormality on the basis of the first recognition result indicating whether or not there is an obstacle and the avoidance operation presence information indicating whether or not an operation for avoiding the obstacle has been performed (Step S105).

Specifically, the recognition abnormality presence/absence determination unit 24 determines that there is no recognition abnormality when the first recognition result is a first recognition result indicating that there is an obstacle, and an obstacle avoidance operation has been performed. The recognition abnormality presence/absence determination unit 24 determines that there is no recognition abnormality when the first recognition result is a first recognition result indicating that there is no obstacle, and an obstacle avoidance operation has not performed. That is, the recognition abnormality determination unit 24 determines that there is no recognition abnormality when the first recognition result and the avoidance operation presence information match.

The recognition abnormality presence/absence determination unit 24 determines there to be an incorrect detection in the recognition abnormality when the first recognition result is a first recognition result indicating that there is an obstacle, and an obstacle avoidance operation has not been performed. The recognition abnormality presence/absence determination unit 24 determines there to be non-detection in the first recognition result when the first recognition result is a first recognition result indicating that there is no obstacle, and an obstacle avoidance operation has been performed. That is, the recognition abnormality presence/absence determination unit 24 makes a determination of non-detection or incorrect detection when the first recognition result and the avoidance operation presence information match.

When the first recognition result is determined to be a recognition abnormality, the recognition abnormality recording unit 25 generates upload data including the first recognition result determined to be the recognition abnormality and the captured image used to generate the first recognition result, and records that data in the database 204 (Step S106). The first recognition result in the upload data may include information indicating whether or not there is an obstacle, and information such as the coordinates at which the obstacle is located or the coordinates of a range within the image indicating the obstacle. The transmission unit 26 transmits the upload data to the obstacle recognition assistance device 1 (Step S107). It is determined whether the processing of the control unit 21 of the vehicle-mounted device 2 is to be ended (Step S108). When the processing is not to be ended, the control unit 21 performs control to repeat steps S101 to S107.

Figure 5:
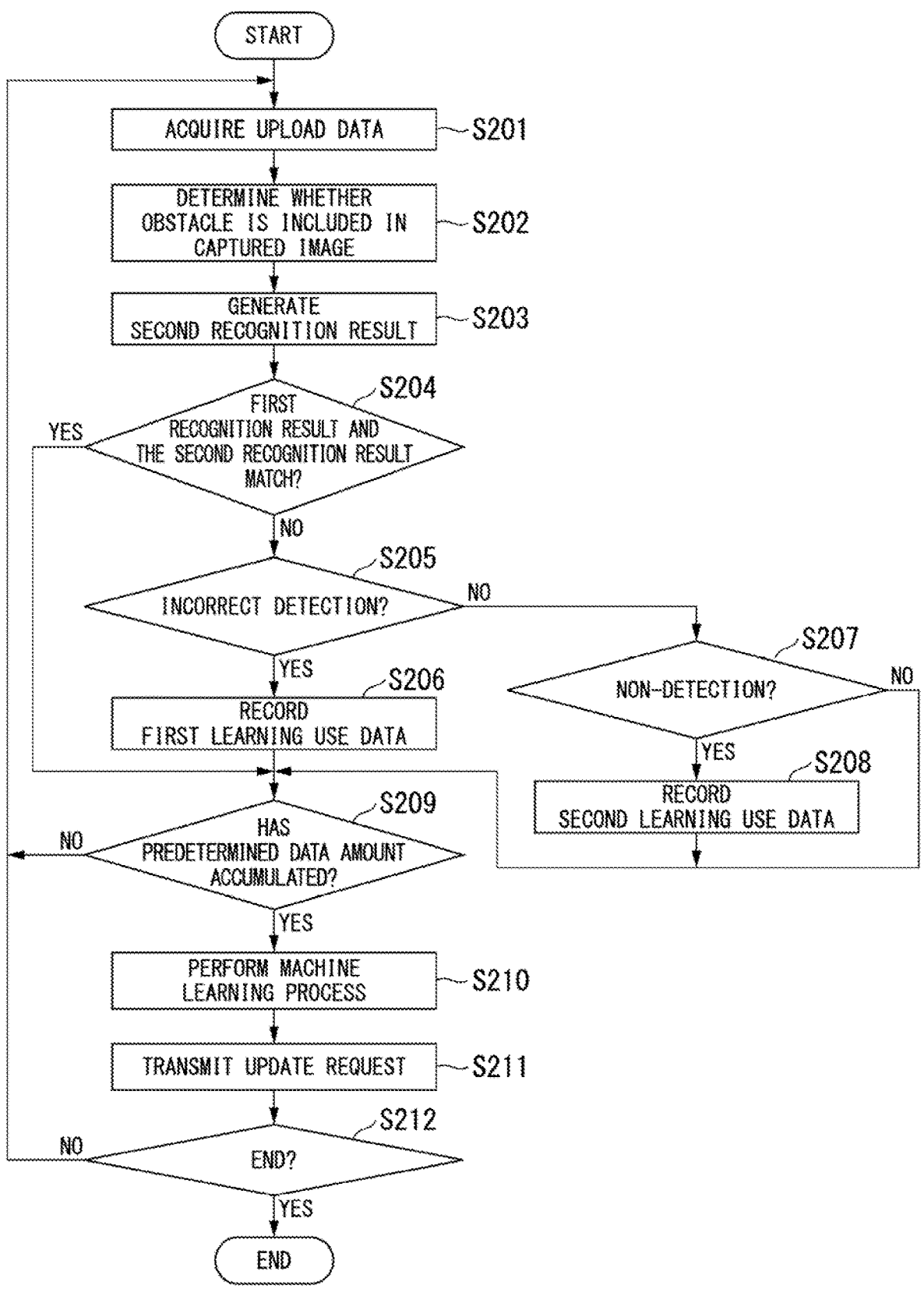
FIG. 5 is a diagram showing the processing flow of the obstacle recognition assistance device.

FIG. 5 is a diagram showing a processing flow of the obstacle recognition assistance device.

The information acquisition unit 12 of the obstacle recognition assistance device 1 acquires the upload data (Step S201). The second recognition unit 13 uses the captured image included in the upload data to perform a second recognition process of determining whether or not the captured image includes an obstacle. At this time, the second recognition unit 13 inputs the captured image to the second convolutional neural network configured based on the second obstacle recognition control parameter, and determines whether or not the captured image includes an obstacle (Step S202). Based on the determination result, the second recognition unit 13 generates a second recognition result including information indicating whether or not the captured image includes an obstacle and the coordinates of the obstacle in the captured image (Step S203). The second recognition unit 13 outputs the second recognition result and the upload data including the captured image used to generate the second recognition result to the learning use data recording unit 14. Since the vehicle-mounted device 2 needs to notify the driver of the presence or absence of an obstacle at a fast response speed, the presence or absence of the obstacle is determined by the first recognition process, for which processing is fast. On the other hand, the obstacle recognition assistance device 1 uses the captured image to perform the second recognition process of an obstacle, which has a greater calculation amount but higher accuracy than the first recognition process of an obstacle performed by the vehicle-mounted device 2 using the captured image. Thereby, the obstacle recognition assistance device 1 accurately verifies the presence or absence of an obstacle even when the vehicle-mounted device 2 has incorrectly detected the obstacle on the basis of the captured image, or when the obstacle could not be detected.

The learning use data recording unit 14 acquires the second recognition result. The learning use data recording unit 14 acquires the first recognition result included in the upload data together with the captured image used to generate the acquired second recognition result. The learning use data recording unit 14 determines whether the first recognition result and the second recognition result match (Step S204). In this determination of a match, the learning use data recording unit 14 determines whether the presence or absence of an obstacle indicated by the first recognition result and the second recognition result and the coordinates of the obstacle in the captured image both match. An example of determining whether the coordinates of the obstacle match will be described. If the distance between the barycentric coordinates of the obstacle detection range indicated by the first recognition result and the barycentric coordinates of the obstacle detection range indicated by the second recognition result is less than a predetermined distance, the learning use data recording unit 14 determines that the first recognition result and the second recognition result match. If the distance between the barycentric coordinates of the obstacle detection range indicated by the first recognition result and the barycentric coordinates of the obstacle detection range indicated by the second recognition result is equal to or greater than the predetermined distance, the learning use data recording unit 14 determines that there is a mismatch. When the first recognition result and the second recognition result match, the learning use data recording unit 14 determines that the obstacle recognition of the vehicle-mounted device 2, which used the captured image, is correct.

On the other hand, when the first recognition result and the second recognition result do not match, the learning use data recording unit 14 determines whether the obstacle recognition of the vehicle-mounted device 2 using the captured image is an incorrect detection (Step S205). Specifically, the learning use data recording unit 14 determines the obstacle recognition of the vehicle-mounted device 2 to be an incorrect detection when both the first recognition result and the second recognition result indicate there is an obstacle, but the coordinates of the obstacle indicated by the first recognition result and the coordinates of the obstacle indicated by the second recognition result do not match. The learning use data recording unit 14 determines that the obstacle recognition of the vehicle-mounted device 2 is an incorrect detection when the information on the presence or absence of the obstacle indicated by the first recognition result and the second recognition result differ from each other. In this case, the learning use data recording unit 14 records first learning use data including at least the captured image, the first recognition result when an incorrect detection is determined, and the negation information indicating this first recognition result in the learning use data storage area of the database 104 (Step S206). Upon making the determination of an incorrect detection, the learning use data recording unit 14 may further record the second recognition result, which is the correct answer information, in the learning use data storage area in association with the first learning use data.

If the obstacle recognition of the vehicle-mounted device 2 using the captured image is not an incorrect detection, the learning use data recording unit 14 determines whether the obstacle recognition of the vehicle-mounted device 2 is non-detection (Step S207). Specifically, the learning use data recording unit 14 searches for the first recognition results acquired in a predetermined period from the present time up to a predetermined time in the past, and if there is no first recognition result that matches the second recognition result among those first recognition results, determines the obstacle recognition of the vehicle-mounted device 2 as non-detection. In this case, the learning use data recording unit 14 stores the second learning use data including at least the captured image, the second recognition result when non-detection has been determined, and affirmative information indicating the second recognition result in the learning use data storage area 104 of the database 104 (Step S208).

The machine learning unit 15 determines whether a predetermined data amount has accumulated in the first learning use data or the second learning use data recorded in the learning use data storage area (Step S209). When the predetermined data amount has accumulated in the first learning use data or the second learning use data recorded in the learning use data storage area, the machine learning unit 15 performs machine learning process using the first learning use data or the second learning use data (Step S210). The machine learning unit 15 inputs the captured image to the first convolutional neural network used for determining whether or not there is an obstacle in the captured image to calculate a first obstacle recognition control parameter that improves the accuracy of the first convolutional neural network, by machine learning process. The machine learning unit 15 outputs the first obstacle recognition control parameter to the updating unit 16. The updating unit 16 transmits an update request including the newly calculated first obstacle recognition control parameter to the vehicle-mounted device 2 (Step S211). The vehicle-mounted device 2 updates the obstacle recognition control parameter stored in advance to the obstacle recognition control parameter included in the newly received update request. When the processing is not to be ended, the control unit 11 performs control to repeat steps S201 to S211.

The accumulated amount of the first learning use data and the second learning use data, the imaging time of the captured image when the learning use data is recorded, the brightness, and the like are various. For this reason, the machine learning unit 15 may determine whether or not the image capture conditions of the captured images are not biased. In this case, after selecting the first learning use data or the second learning use data so that the imaging conditions of the captured images are not biased, the machine learning unit 15 may perform the machine learning process using the selected first learning use data or the second learning use data. Thereby, it is possible to calculate an obstacle recognition control parameter that can improve the accuracy of recognizing the presence or absence of an obstacle with higher accuracy.

According to the above processing, in the case of a recognition abnormality such as the recognition result being incorrect detection or non-detection with a mismatch between the result of determining whether or not there is an obstacle and the obstacle avoidance operation by the driver in the vehicle-mounted device 2, the obstacle recognition assistance device 1 performs recording of the learning use data according to the obstacle presence/absence recognition result using the captured image and the obstacle presence/absence recognition result in the vehicle-mounted device 2, and repeats the machine learning process. Thereby, the obstacle recognition accuracy in the vehicle-mounted device 2 can be improved.

Figure 6:
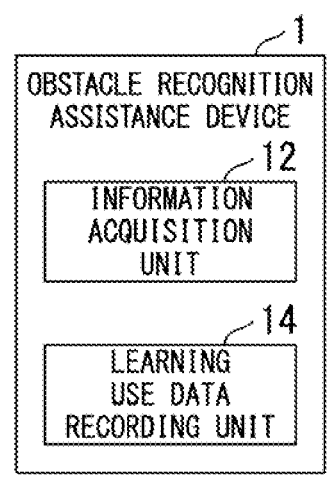
FIG. 6 is a diagram showing a minimum configuration of the obstacle recognition assistance device.

FIG. 6 is a diagram showing the configuration of the obstacle recognition assistance device.

The obstacle recognition assistance device 1 includes at least an information acquisition unit 12 and a learning use data recording unit 14.

The information acquisition unit 12 obtains a first recognition result that indicates whether or not there is an obstacle and that is output by the first recognition process based on the obstacle recognition control parameter and the captured image, together with the captured image when that first recognition result is a recognition abnormality.

The learning use data recording unit 14 verifies whether an obstacle recognition abnormality has occurred in the first recognition result on the basis of the second recognition result generated by the second recognition process for the presence or absence of the obstacle on the basis of the sensing information and the first recognition result. When it is verified that a recognition abnormality has occurred, the learning use data recording unit 14 records the first learning use data including at least a combination of the captured image and negation information of the first recognition result or second learning use data including at least a combination of the captured image and affirmation information of the second recognition result.

The above description described the connection of the vehicle-mounted device 2 and the obstacle recognition assistance device 1 via a communication network, with the above-described processing being performed by mutual cooperation of the devices. However, the configuration is not limited thereto. The obstacle recognition assistance device 1 may be provided in the vehicle, whereby the vehicle-mounted device 2 and the obstacle recognition assistance device 1 in the vehicle may be communicatively connected to perform the same processes. Alternatively, the vehicle-mounted device 2 may include the function of the obstacle recognition assistance device 1, and the vehicle-mounted device 2 may perform all the same processing as the processing described using the flowcharts of FIGS. 4 and 5. In this way, when the vehicle-mounted device 2 performs the processing for all the functions of the obstacle recognition assistance device 1, detection of the presence or absence of an obstacle having a high processing load in the second recognition unit 13 may be performed little by little when the vehicle is stopped or at a timing when there are unallocated calculation resources.

Further, according to the above-described processing, when the vehicle-mounted device 2 has made a determination of an incorrect detection (there is an obstacle in the captured image and there is no obstacle avoidance operation), there are times when a determination is made in the obstacle recognition assistance device 1 that the obstacle recognition of the obstacle recognition of 2 using the captured image is correct. In this case, the vehicle-mounted device 2 comes to output an unnecessary alarm based on the incorrect detection. In such a case, the obstacle recognition assistance device 1 may generate, separately from the above-mentioned obstacle recognition control parameter, a parameter for reducing false alarms based on the incorrect detection in the vehicle-mounted device 2, and transmit the parameter to the vehicle-mounted device 2.

Further, according to the processing described above, an obstacle is detected using the captured image generated by the camera 3, but it is not limited to such a case. Even when an obstacle is detected based on sensing information using another sensing device, it is possible to improve the obstacle recognition accuracy of the obstacle detection device by the same process. For example, the obstacle detection device may be a radar. Also in this case, the obstacle recognition assistance device 1 acquires a first recognition result indicating whether or not there is an obstacle, being output as the result of the first recognition process using the obstacle recognition control parameter and the sensing information by the radar of the obstacle detection device (vehicle-mounted device 2), together with the sensing information when the first recognition result is a recognition abnormality. The obstacle recognition assistance device 1 verifies whether an obstacle recognition abnormality has occurred in the first recognition result on the basis of the second recognition result generated by the second recognition process for the presence or absence of the obstacle on the basis of the sensing information and the first recognition result. When it is verified that a recognition abnormality has occurred, the obstacle recognition assistance device 1 records the first learning use data including at least a combination of the sensing information and negation information of the first recognition result or second learning use data including at least a combination of the sensing information and affirmation information of the second recognition result.

Further, the above description covered the case in which the obstacle detection device is provided in a vehicle and recognizes the presence or absence of an obstacle in the traveling direction such as the front or the rear, but it is not limited thereto. For example, an obstacle detection device may be provided in a construction machine (such as a crane device) and used to recognize the presence or absence of an obstacle in the rotation direction of the construction machine. In addition to a vehicle, provided there is an enhancement in the obstacle recognition accuracy of the obstacle detection device that detects obstacles with respect to an operational object to be operated by the operator, the obstacle detection device may be applied to any operation target (aircraft, ship, etc.).

The obstacle recognition assistance device 1 and the vehicle-mounted device 2 described above have a computer system inside. The process of each process described above is stored in a computer-readable recording medium in the form of a program, with the above process being performed by the computer reading and executing the program. Here, the computer-readable recording medium refers to a magnetic disk, a magneto-optical disk, a CD-ROM, a DVD-ROM, a semiconductor memory, or the like. Further, this computer program may be distributed to the computer via a communication line, and the computer that receives this distribution may execute the program.

Also, the above program may be for realizing some of the functions described above. Further, the program may be a so-called differential file (differential program) that can realize the functions described above in combination with a program already recorded in the computer system.

This application is based upon and claims the benefit of priority from Japanese Patent Application No. 2018-52475, filed Mar. 20, 2018, the disclosure of which is incorporated herein in its entirety.

INDUSTRIAL APPLICABILITY

The present invention may be applied to an obstacle recognition assistance device, an obstacle recognition assistance method, and a storage medium.

REFERENCE SYMBOLS

1: Obstacle recognition assistance device
2: Vehicle-mounted device
3: Camera
4: Steering wheel operation detection device
5: Brake operation detection device
6: Alarm device
11, 21: Control unit
12, 22: Information acquisition unit
13: Second recognition unit
14: Learning use data recording unit
15: Machine learning unit
16: Updating unit
23: First recognition unit
24: Recognition abnormality presence/absence determination unit
25: Recognition abnormality recording unit
26: Transmission unit
27: Alarm output unit

The invention claimed is:
1. An obstacle recognition assistance device comprising:
a memory configured to store instructions; and
a processor configured to execute the instructions to:
acquire a first recognition result and sensing information, the first recognition result being a result based on a first recognition process performed using the sensing information acquired by an obstacle sensing device, the first recognition result indicating whether or not an obstacle is present;
verify whether the first recognition result is incorrect based on the first recognition result and a second recognition result, the second recognition result being a result based on a second recognition process performed using the sensing information, the second recognition process indicating whether or not the obstacle is present; and record a verification result, wherein the verification result is a result of the verification of whether the first recognition result is incorrect.

2. The obstacle recognition assistance device according to claim 1,
wherein the first recognition result is a result determined to be incorrect.

3. The obstacle recognition assistance device according to claim 1,
wherein recoding the verification result comprises
recording the verification result when it is verified that the first recognition result is incorrect, the verification result comprising at least one of first learning use data and second learning use data, the first learning use data including at least a combination of the sensing information and negation information indicating a negation of the first recognition result, the second learning use data including at least a combination of the sensing information and affirmation information indicating an affirmation of the second recognition result.

4. The obstacle recognition assistance device according to claim 3,
wherein the processor is configured to execute the instructions to: calculate an obstacle recognition control parameter by machine learning using at least one of the first learning use data and the second learning use data, and update an obstacle recognition control parameter used in the first recognition process to the calculated obstacle recognition control parameter.

5. The obstacle recognition assistance device according to claim 1,
wherein the processor is configured to execute the instructions to: generate the second recognition result by the second recognition process.

6. The obstacle recognition assistance device according to claim 1, wherein the second recognition process is a process with higher accuracy in obstacle recognition than the first recognition process.

7. The obstacle recognition assistance device according to claim 3,
wherein the recording the verification result when it is verified that the first recognition result is incorrect comprises:
recording the first learning use data when the first recognition result indicates that there is an obstacle and it is verified that the first recognition result is incorrect; and
recording the second learning use data when the first recognition result indicates that there is no obstacle and it is verified that the first recognition result is incorrect.

8. The obstacle recognition assistance device according to claim 1,
wherein the processor is configured to execute the instructions to:
determine whether the first recognition result matches operation information based on the first recognition result and the operation information, the operation information indicating an operation by a user of an operation target that is provided with the obstacle sensing device; and determine that the first recognition result is incorrect when it is determined that the first recognition result does not match the operation information.

9. An obstacle recognition assistance method comprising:
acquiring a first recognition result and sensing information, the first recognition result being a result based on a first recognition process performed using the sensing information acquired by an obstacle sensing device, the first recognition result indicating whether or not an obstacle is present;
verifying whether the first recognition result is incorrect based on the first recognition result and a second recognition result, the second recognition result being a result based on a second recognition process performed using the sensing information, the second recognition process indicating whether or not the obstacle is present; and
recording a verification result, wherein the verification result is a result of the verification of whether the first recognition result is incorrect.

10. An information processing method comprising:
uploading a first recognition result and sensing information to an obstacle recognition assistance device, the first recognition result being a result based on a first recognition process performed using the sensing information acquired by an obstacle sensing device, the first recognition result indicating whether or not an obstacle is present;
receiving an update request calculated based on a verification result of whether the first recognition result is incorrect based on the first recognition result and a second recognition result, the second recognition result being a result based on a second recognition process performed using the sensing information by the obstacle recognition assistance device, the second recognition process indicating whether or not the obstacle is present.

11. The information processing method according to claim 10, further comprising
updating an obstacle recognition control parameter based on the update request.

12. The information processing method according to claim 10, wherein the first recognition result is a result determined to be incorrect.

13. The obstacle recognition assistance device according to claim 1, wherein the sensing information comprises an image.

14. The obstacle recognition assistance device according to claim 1, wherein the sensing information comprises radar information.

15. The obstacle recognition assistance method according to claim 9, wherein the sensing information comprises an image.

16. The obstacle recognition assistance method according to claim 9, wherein the sensing information comprises radar information.

17. The information processing method according to claim 10, wherein the sensing information comprises an image.

18. The information processing method according to claim 10, wherein the sensing information comprises radar information.

* * * * *

UNITED STATES PATENT AND TRADEMARK OFFICE
CERTIFICATE OF CORRECTION

PATENT NO. : 11,847,562 B2  
APPLICATION NO. : 17/849816  
DATED : December 19, 2023  
INVENTOR(S) : Kazuki Ogata Page 1 of 1

It is certified that error appears in the above-identified patent and that said Letters Patent is hereby corrected as shown below:

In the Claims

In Claim 1, Column 13, Line 2, delete "process" and insert --result--.

In Claim 3, Column 13, Line 13, delete "recoding" and insert --recording--.

In Claim 9, Column 14, Line 16, delete "process" and insert --result--.

In Claim 10, Column 14, Line 36, delete "process" and insert --result--.

Signed and Sealed this  
Tenth Day of February, 2026

John A. Squires  
*Director of the United States Patent and Trademark Office*